United States Patent
Bashir et al.

(10) Patent No.: US 7,608,652 B2
(45) Date of Patent: Oct. 27, 2009

(54) CATALYST COMPOSITION FOR PRODUCING POLYETHYLENE TEREPHTHALATE FROM TEREPHTHALIC ACID AND ETHYLENE GLYCOL, AND PROCESS THEREFORE

(75) Inventors: Zahir Bashir, Riyadh (SA); Jamil Siddiqui, Riyadh (SA); Venkatanathan Sampath, Riyadh (SA); Khalid Al-Luhaidan, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 10/592,338

(22) PCT Filed: Feb. 10, 2005

(86) PCT No.: PCT/IB2005/001249

§ 371 (c)(1),
(2), (4) Date: Jul. 23, 2007

(87) PCT Pub. No.: WO2005/087839

PCT Pub. Date: Sep. 22, 2005

(65) Prior Publication Data

US 2008/0033084 A1    Feb. 7, 2008

(30) Foreign Application Priority Data

Mar. 11, 2004   (EP)   ............... 04005822

(51) Int. Cl.
    *C07F 7/00*   (2006.01)
(52) U.S. Cl. .............. 524/176; 502/152; 502/154; 502/174; 502/216; 502/226; 502/353; 528/281; 528/285
(58) Field of Classification Search ........... 528/281, 528/285; 502/152, 154, 174, 216, 226, 353; 524/176
    See application file for complete search history.

(56) References Cited

U.S. PATENT DOCUMENTS 5,608,031 A * 3/1997 Yau et al. .............. 528/281
5,623,047 A * 4/1997 Yuo et al. .............. 528/285

OTHER PUBLICATIONS

Odian ("Principles of Polymerization", 3rd Ed., p. 98-99 John Wiley & Son, 1991).*

* cited by examiner

*Primary Examiner*—Randy Gulakowski
*Assistant Examiner*—Shane Fang
(74) *Attorney, Agent, or Firm*—Jim Wheelington

(57) ABSTRACT

The present invention relates to a catalyst composition for producing polyethylene terephthalate from terephthalic acid and ethylene glycol, comprising:
  (i) an antimony compound, being present such that the elemental antimony is in a range of about 15 ppm to less than 150 ppm;
  (ii) a zinc compound, being present such that the elemental zinc is in a range of about 40 to about 160 ppm;
as well as a process for the preparation thereof.

15 Claims, No Drawings

CATALYST COMPOSITION FOR PRODUCING POLYETHYLENE TEREPHTHALATE FROM TEREPHTHALIC ACID AND ETHYLENE GLYCOL, AND PROCESS THEREFORE

Polyethylene terephthalate (PET) is produced in two steps by one of two ways, called the DMT and the PTA processes.

The older process used dimethyl terephthalate (DMT) and ethylene glycol (EG) as starting materials. This was because of the non-availability of terephthalic acid of sufficient purity in the early years of polyester production. In the DMT process, in the first step, DMT is trans-esterified with ethylene glycol (EG) to produce an intermediate called diethylene glycol terephthalate (DGT) plus a small amount of low oligomers. The DGT is alternatively called bis hydroxy ethyl terephthalate or BHET in the literature. Manganese (II) acetate or zinc (II) acetate is typically used as catalyst for this transesterification step. In the second step, the DGT is heated to ~280° C. under high vacuum to carry out melt-phase polycondensation. The principal volatiles (reaction byproducts) eliminated are EG and water. For the second step in the DMT route, the catalyst from the first step is sequestered or deactivated with phosphoric acid (see U.S. Pat. No. 5,898,059), and another catalyst for polycondensation, most commonly antimony triacetate or antimony trioxide is added. About 250 ppm each of metal catalyst is added at both steps, so that the final polymer from the DMT process has typically about 500 ppm of total metal content. Note in an usual operation, it is possible to go from step 1 to step 2 without isolating the DGT. However, if desired the DGT and oligomers formed in step 1 can be isolated and can be used later for melt polycondensation (step 2).

The newer, industrial method uses purified terephthalic acid (PTA) instead of DMT and is called the PTA process. In step 1, PTA is esterified with EG to form DGT and oligomers. The main byproduct that is distilled off is water, instead of methanol. This step can be self-catalysed—that is, a catalyst is not necessary. However, the polycondensation catalyst (that plays a role later in step 2) may be included at step 1. Step 2 is the same as in the DMT process. A polycondensation catalyst, most commonly antimony triacetate or trioxide is added at levels of 200-300 ppm (wt./wt antimony metal with respect to PET). Again, the molten DGT is heated at ~280° C. under vacuum to cause polycondensation. After the melt reaches a suitable intrinsic viscosity (I.V.), it is discharged and chipped. The I.V. is related to molecular weight. The metal content of the PTA polymer is less than the DMT polymer, as only one catalyst (for polycondensation) is used for step 2, and hence the thermal stability of the polymer is higher.

PET may be produced in batch reactors. However, today large-scale production is based on a continuous PTA system. The melt-phase, continuous polycondensation technology consists of a train of reactors in series. At the start, there is usually a paste mixing vessel (where EG, PTA, catalyst and additives are added), one or two esterification reactors, one or two prepolycondensation reactors followed by a high-vaccum, finisher reactor for the final stages of polycondensation. This is described in standard works (see S. M. Aharoni, chapter 2; V. B. Gupta and Z. Bashir, chapter 7, both in "Handbook of Thermoplastic Polyesters", vol. 1, editor S. Fakirov, Wiley-VCH, 2002). The polymer from the finisher may be extruded into filaments, quenched under water and cut to form amorphous chips.

For film and fibre applications, PETs with I.V.s in the range 0.58-0.64 dL/g are sufficient. Films and fibres can be produced directly by extruding the melt from the polymerisation reactor, and most modem plants based on the PTA process are geared for this. It is even possible to reach I.V.s of 0.8-1.0 dL/g by melt polycondensation but special, non-standard reactors are necessary because of the high melt viscosity. For the PET bottle grade resin, polymers with I.V.s' of 0.75-0.85 dL/g, with low residual acetaldehyde are required. In this case however, a split process is used to attain this I.V. with low acetaldehyde. The general practice is to make polymer chips with an intermediate I.V. of ~0.63 dL/g by melt polycondensation, and then uplift the I.V. to about 0.75-0.85 dL/g by solid-state polycondensation (SSP). This split procedure allows high I.V. resin to be made with minimal quantities of acetaldehyde, a degradation byproduct that affects the taste of beverages packed in PET bottles. For a description of melt phase and SSP technology, see V. B. Gupta and Z. Bashir, chapter 7 in "Handbook of Thermoplastic Polyesters", vol. 1, editor S. Fakirov, Wiley-VCH, 2002.

PET is produced commercially using mostly antimony triacetate or antimony trioxide as polycondensation catalysts. Among the three industrially established metals (antimony, germanium and titanium) for PET catalysis, antimony-based catalysts account for over 90% of current industrial production. Antimony shows a good balance between polycondensation speed, polymer properties and thermal stability towards degradation. One disadvantage with PET made with antimony compounds is the grey colour resulting from precipitation of antimony metal. Further, antimony is fairly expensive and shows some environmental concerns. Germanium catalysts are used mostly in Japan. These give a very bright polymer, without the grey cast. But the disadvantage is the high cost of germanium compounds. Titanium catalysts on a mole metal ion basis are the most active in terms of polycondensation rate, but these give a yellow tint to the polymer that is difficult to colour-compensate afterwards. Further, the titanium compounds used for PET catalysts have to be specially synthesized for the purpose, which adds to the cost. With titanium catalysts, the very high polycondensation speeds cannot be fully utilized in practice because of the strong degree of yellowing; the concentration of the Ti catalyst has to be reduced, or its activity has to be tempered by various means, so that one settles for a polycondensation speed similar to that obtained when using antimony at levels of about 200 ppm. Hence, titanium catalysts cannot be used to increase productivity levels of current melt polycondensation technology, and at best they are only substitutes for reproducing the catalytic activity corresponding to ~200 ppm of antimony. Further, it does not follow that if a catalyst increases melt polycondensation activity, the same will occur in SSP. In fact, it has been found that some catalysts, while very active during melt polycondensation may even show reduced activity in SSP. For example, titanium catalysts are faster than antimony in melt polycondensation as shown by Tomita (Polymer, 17, 221 (1976)) and Shah et al., (Polymer, 25, 1333 (1984) supra, on a mole basis. Yet, titanium catalysts are slower than antimony in SSP, and this can be a handicap.

It was desired to increase the productivity of PET production using the PTA process. In principle this is possible by merely increasing antimony concentrations. If the antimony level is increased beyond 200 ppm (or $3.19 \times 10^{-4}$ mol Sb metal/mol PTA), the polycondensation times are reduced with increasing catalyst concentration but after about 500 ppm (or $7.89 \times 10^{-4}$ mol Sb metal/mol PTA), there is diminishing return in reducing reaction times. Although the reduction in time is advantageous, the problem is that the polymer becomes progressively darker with increasing antimony concentration. About 300 ppm (or $4.73 \times 10^{-4}$ mol Sb metal/mol PTA) is the practical limit where the colour may be tolerable. Thus, in current industrial practice, 200-300 ppm of antimony (or $3.19 \times 10^{-4}$ to $4.73 \times 10^{-4}$ mol Sb metal/mol PTA) is used. Current technology therefore has reached a limit with PET polymerisation productivity, because factors such as the dark polymer colour, the catalyst cost, and environmental hazards of using higher antimony levels are obstacles.

The cause for the grey colour found with antimony-based PET has been attributed to reduction of the catalyst to the metal form. It has been shown that in an ethylene glycol atmosphere, small amounts of CO and other gases are formed in the esterification reactor (see S. Aharoni, Journal of Polymers Sci. & Engineering, 38, 1039 (1998)), due to thermal decomposition of the ethylene glycol. The CO is a reducing agent and it reduces the antimony compound to a finely-divided metallic antimony. With antimony-based catalysts, 10-15% of the initially added catalyst ends up as finely divided antimony metal. Thus increasing the antimony level beyond the standard of about 200-300 ppm automatically increases the amount of metallic antimony deposited in the polymer, and this makes it darker. The chemical reduction to metallic antimony also leads to the deposition of a black sludge in reactors, causing downtime during cleaning operations. This is unavoidable as the decomposition of the EG is unstoppable and hence the presence of CO is also inevitable.

In one special application, the reduction of the antimony catalyst to metallic antimony is used for advantage. It is disclosed in U.S. Pat. No. 5,419,936 that by adding extra antimony than for normal catalysis and deliberately reducing a portion of it to the metallic form by adding extra phosphorus compounds, it is possible to get a PET that shows enhanced pick-up of infrared radiation. This polymer is darker in colour but it is useful in making PET preforms (for bottles) with enhanced heat pick-up capability during the stretch-blow moulding process. Apart from this specialist application, no one desires a darkened PET.

The polymer made with antimony catalyst will also have some yellowing (in addition to the grey cast). This is corrected in industrial practice by adding an organic blue toner and sometimes an additional additive such as the pink coloured cobalt (II) acetate (about 15-20 ppm Co metal). These additives cannot remove the grey cast in the antimony polymer, and their presence also reduces further the brightness. PET is used in applications that require high transparency and brilliance, for instance films and bottles. In textiles, the colours of dyed fabrics have a higher intensity if the base polymer is intrinsically bright and does not have a dull, grey cast.

In the search for high productivity catalysts that can reduce polycondensation times drastically compared with standard antimony catalyst, mixtures with antimony and other elements have been tried. With regard to prior art on this subject, U.S. patents application Ser. No. 07/355,534, U.S. Pat. No. 5,008,230 and U.S. Pat. No. 5,166,311 describe a tri-component catalyst for the PTA system with antimony between 150-650 ppm, a second component of cobalt/and or zinc between 5-60 ppm, and a third component consisting of 10-150 ppm of zinc, magnesium, manganese or calcium. As zinc can be present in the second and third components, a bimetallic composition with antimony between 150-650 ppm and 5-210 ppm of zinc is also possible. With these compositions, it was claimed that it is possible to reduce polycondensation times drastically, by at least one-third, compared to the conventional system comprising just antimony. Separate but related U.S. Pat. Nos. 5,153,164 and 5,162,488 extend the range of antimony to 650-1100 ppm, while the second component of cobalt and/or zinc is between 15-60 ppm, and the third component of zinc, magnesium, manganese or calcium is kept at 10-150 ppm. Again, a bimetallic composition with antimony between 650-1100 ppm and 15-210 ppm of zinc is also possible. A European version of these patents is EP 0399742. It combines the separate works into one : the first component is antimony between 150-1100 ppm, while the second component of cobalt and/or zinc is between 15-60 ppm, and the third component of zinc, magnesium, manganese or calcium is kept at 10-150 ppm. Again, a bimetallic composition with antimony between 150-1100 ppm and 15-210 ppm of zinc is also possible.

U.S. Pat. No. 5,623,047 claims that the appearance of the PET made from the PTA process can be improved (yellow colour due to degradation can be reduced) by incorporating an alkali metal acetate like sodium acetate as a third component. Their three-component catalyst system consists of (a) an antimony salt catalyst in the range 10-1000 ppm, (b) 10-500 ppm of a metal-salt catalyst of at least one of cobalt, magnesium, zinc, manganese, calcium and lead, and (c) an alkali metal acetate present in the range 10-500 ppm. U.S. Pat. No. 5,608,032 is similar but uses a phosphorus salt co-catalyst as the third component (instead of the alkali metal acetate) to get reduced polycondensation times with better colour values. In these two patents, a three-element mixture is always necessary, which adds to the cost.

In the aforementioned prior art involving antimony mixed with other elements, such as U.S. Pat. Nos. 5,008,230; 5,166,311; 5,153,164; 5,162,488; 5,623,047 and 5,608,032, a handicap is that the catalytic activity during solid state polycondensation (SSP) is not disclosed. It is important for the production of bottle grade PET that the SSP rate is at least comparable to PET made with 200-300 ppm antimony.

It is an object of the present invention to provide for a catalyst composition for producing polyethylene terephthalate from terephthalic acid and ethylene glycol with greatly enhanced productivity in melt phase polycondensation, wherein the grey discoloration that normally arises in PET made from antimony-based catalyst is minimised. Further, it is an object to provide a catalyst composition that can be used in a split process (melt polycondensation followed by SSP), such that the enhanced activity shown in melt polycondensation is backed up by at least similar activity in SSP as a standard antimony catalyst. It is a further objective to provide a catalyst composition that is less expensive and shows decreased environmental concerns compared to the ones of the prior art.

Additionally, it is an object of the present invention to provide for a process for the preparation of polyethylene terephthalate utilising the inventive catalyst composition.

The first object is achieved by a catalyst composition for producing polyethylene terephthalate from terephthalic acid and ethylene glycol, comprising:

(i) an antimony compound, being present such that the elemental antimony is in a range of about 15 ppm to less than 150 ppm;

(ii) a zinc compound, being present such that the elemental zinc is in a range of about 40 to about 160 ppm.

It is preferred that the elemental antimony content from the antimony compound is in a range of about 80 to about 140 ppm, preferably of about 100 to about 140 ppm, and wherein the elemental zinc content from the zinc compound is in a range of about 50 to about 160 ppm, preferably in a range of about 80 to about 140 ppm.

Still preferred is that the antimony compound is selected from the group consisting of antimony triacetate, antimony trioxide, antimony tricarbonate, antimony glycolate or mixtures thereof.

The zinc compound is selected from the group consisting of zinc acetate, zinc oxide, zinc peroxide, zinc sulphide, zinc carbonate, zinc hydroxide, zinc halide, zinc metal or mixtures thereof.

The second object is achieved by a process for the production of polyethylene terephthalate from terephthalic acid and ethylene glycol, comprising the steps of:
(a) preparing a catalyst composition according to the invention;
(b) placing the catalyst composition, the terephthalic acid and the ethylene glycol in a vessel; and
(c) reacting the terephthalic acid and the ethylene glycol in an esterification step and a melt phase polycondensation step to obtain polyethylene terephthalate.

Optionally, for certain product applications of PET, the polycondensation step is a melt phase polycondensation step which may be stopped after an intermediate molecular weight has been reached, and the polymer is chipped, but further polycondensation is carried out in a solid state polycondensation to increase the molecular weight.

Still preferred is that the esterification step is conducted at a temperature of about 230 to about 260° C., preferably under nitrogen pressure, and wherein the polycondensation step is conducted at a temperature of about 270 to about 290° C.

The polycondensation step may be conducted in the melt phase under high vacuum in a batch process.

Most preferably, the polycondensation is conducted in the melt phase in a continuous process using a train of reactors in series for esterification and polycondensation.

In one aspect the polycondensation step is conducted in a split operation using first a melt phase polycondensation step under high vacuum and subsequently a solid state polycondensation step, under vacuum or nitrogen flow.

Preferably the solid state polycondensation step is conducted in a batch or continuous operation.

In one embodiment a comonomer is additionally placed in the vessel before the start of the polycondensation step.

Preferably the comonomer is isophthalic acid, cyclohexane dimethanol or mixtures thereof.

Still preferably phosphoric acid in an amount of about 10 to about 30 ppm is added to the vessel, and at least one colour correction ingredient, such as cobalt acetate and/or blue toner, is added to the vessel.

Further the catalyst components may be placed in the vessel together before, during or after the esterification step.

Alternatively the catalyst components may be placed in the vessel separately and at different times before, during or after the esterification step.

The catalyst composition may be used in any industrial, continuous or batch, reactor system for making PET with the PTA process.

It has to be noted that all weight ppm amounts given in the application are based on the theoretical yield of polyethylene terephthalate. Further, it has to be emphasised that no alkali metal acetate or any further catalyst component is necessary for the inventive catalyst composition, in order to achieve the objects.

Surprisingly, the present invention provides for a catalyst composition where antimony is one component, where the second component is based on readily available compounds that do not have to be synthesized specially, such that it increases polyester productivity hugely and improves the polymer brightness, while cutting the catalyst cost at the same time. This catalyst composition is based on antimony and zinc compounds, using low antimony contents. A lower amount of antimony is advantageous as it is three times more expensive than zinc, and it helps in attaining higher brightness values.

Further, reducing the amount of a heavy metal like antimony is always desirable from an environmental point of view. The catalyst composition disclosed provides a drastic reduction in melt polycondensation times, similar or higher than in the prior art. Further, it is shown that this catalyst composition is effective in solid-state polycondensation.

EXAMPLES

The following examples are intended to be illustrative of this invention only. They are, of course, not to be taken in any way as limiting on the scope of this invention. Numerous changes and modifications can be made with respect to the invention. The examples use a standard bottle-grade PET resin recipe containing 1.55% isophthalic acid (IPA) comonomer. However, all the reactions described work also with PET homopolyester (without IPA).

All polymers were made in a conical-shaped, batch reactor with capacity of 10 liters. All ingredients (PTA, EG, IPA, antimony triacetate, zinc compound, cobalt acetate, blue toner, and phosphoric acid) were added together at the beginning. The esterification reaction was conducted at 253° C. under nitrogen pressure. This led to the formation of molten DGT. After the expected amount of water was collected, the vessel was heated to 278° C. and a vacuum of ~1 mbar was applied to start polycondensation. The melt was stirred with an agitator. When polycondensation starts, the stirrer torque rises due to the increasing melt viscosity arising from the rise in molecular weight. The intrinsic viscosity or I.V. is a measure of the molecular weight of the polymer and is measured by dilute solution viscometry. By previous calibration, it was known that for the standard polymer recipe of example 2 (see below), a stirrer torque of 13.5 Nm corresponds to an I.V. of ~0.63-0.66 dL/g. All polymers from the reactor were discharged when the agitator torque reached 13.5 Nm. The melt was discharged in the form of a single molten strand into a quenching water bath by breaking the vaccum and applying nitrogen pressure. The strand was fed to a chip cutter to form transparent, amorphous chips.

Selected samples were subjected to solid-state polymerization (SSP). In this, the amorphous chips with I.V. of ~0.64 dL/g made by melt phase polymerization, were polymerized further at 210° C. (that is, in the solid state). First the transparent, amorphous chips were heated at 170° C. for 1 hour to crystallize the chips and prevent their subsequent sticking during SSP at 210° C. The crystallized chips were then placed in a bench scale SSP reactor at 210° C. Dry nitrogen was passed through the chip bed and this carries away the volatiles (EG and water) from polycondensation. The SSP was conducted at 210° C. for 6 hours, and the I.V.s of a standard polymer with antimony only and of polymers with antimony-zinc catalyst were compared.

As mentioned, the intrinsic viscosity or I.V. is a measure of the molecular weight of the polymer and is measured by dilute solution viscometry. The I.V. is influenced predominantly by polymer molecular weight, but the solvent type and the solution temperature also have an effect on its numerical value. I.V. values for the same polymer will be different if different solvents and temperatures are used. All the I.Vs. here were measured in a 3:2 mixture of phenol-1,2 di-chlorobenzene solution, at 25° C. The method is based on a single measurement at a single concentration. Typically, about 8-10 chips are dissolved to make a solution with a concentration of 0.5%. The I.V. was obtained from the measurement of relative viscosity $\eta_r$ for a single polymer concentration (0.5%) by using the Billmeyer equation (see F. W. Billmeyer, J. of Polymer Sci. IV, 83 (1949) shown below.

$$I.V.=[\eta]=0.25(\eta_r-1+3\ln\eta_r)/c$$

(valid for the range c=0.5-0.65 g/dL)

The colour parameters were measured with a HunterLab ColorFlex Model No 45/0, serial No. CX 0969. The amorphous chips were used without grinding or crystallisation, in the transparent state. Generally, the changes measured could also be seen by eye. The L* values after SSP are higher because of whitening caused by spherultic crystallisation of the polymer.

Various PETs were made in a bench-scale reactor using the PTA process. All the results are summarized in Tables 1 and 2.

Comparative Example 1

Initially, a 'base polymer' was made with a bottle grade PET recipe, antimony catalyst and no colour-compensation additives. This polymer was made with a standard antimony concentration of 200 ppm of Sb, a typical concentration used in industrial production. The recipe consisted of 2246 g PTA (13.5301 mols of PTA), 41 g (0.2469 moles) of isophthalic acid comonomer (IPA), 1100 g EG, 1.3 g of antimony triacetate catalyst, and 0.195 g of phosphoric acid (19.8 ppm P). If making a homopolyester (without IPA), 2287 g of PTA would be used in the recipe. The IPA is an isomer of PTA and if added, it substitutes directly by mass for the PTA. The recipe above yields 2645.4 g of PET theoretically. It is to be noted that the metal concentration are given in ppm by wt. in Table 1. From the above, the PTA+IPA=2287 g=13.5301+0.2469=13.777 moles of (PTA+IPA). The equivalent concentrations in [mol metal ions/(mol PTA+IPA)] are shown in Table 2. From Table 1 and 2, 1.3 g of antimony triacetate thus corresponds to 200 ppm by weight of antimony with respect to the theoretical yield of polymer, or $3.19\times10^{-4}$ mol Sb/mole [PTA+IPA]. All the materials were added right at the beginning in the batch reactor. Phosphoric acid is added as a melt stabilizer to increase the stability of the melt towards thermal degradation. The polymerizations were stopped when a stirrer torque of 13.5 Nm was reached. This is the 'base polymer 1' in Comparative Example 1 (see Table 1).

The 'base polymer' had a grey tone and a yellow tint. As explained, the grey tone is believed to be due to the reduction of the catalyst to metallic antimony. The colour of the transparent amorphous chips was categorized using the CIE tristimulus L*, a* and b* values. L* indicates the brightness of the samples, with a high value signifying high brightness. L*=100 stands for perfectly white; L*=0 is perfectly black. The a* value indicates the greenness or redness of the sample (- value indicates greenness; + value indicates redness). The b* value indicates blueness or yellowness (- value indicates blue; + indicates yellow). Accordingly from Table 1, Comparative Example 1, it was found that the above amorphous chips had a yellow tint (b*=3.13) and L*=64.7. The polycondensation time was 133 minutes. The total reaction time was 313 minutes (Comparative Example 1), wherein the total reaction time is the sum of reactor heat-up times, esterification time and polycondensation time. The reactor heat-up time should be the same in all examples. Differences in total reaction times in the examples are therefore due to differences in esterification and polycondensation times.

Comparative Example 2

In actual industrial practice with the PTA process, to overcome the yellow tint, colour compensation is necessary and this is relatively straightforward. It is common to add a blue toner and a bluing agent such as cobalt (II) acetate, to correct the yellow. Cobalt acetate is also a catalyst, but at the levels added for colour correction, it has little effect on polycondensation times. Thus, in the next experiment PET was made with the same recipe as in Comparative Example 1 but 0.175 g of cobalt acetate (15.7 ppm of cobalt metal) and 0.0053 g blue toner were added. This is the colour-compensated 'standard polymer' of Comparative Example 2 (see Table 1). Table 1 shows that the b*value is now −5.1. This polymer has a blue tint, as this is often desired in preference to a more neutral tint (b*~0). While the addition of cobalt acetate and blue toner compensates the yellow tint, the L* value however decreases drastically from 64.7 to 57.2, that is, there is a visible darkening of the polymer. Cobalt acetate in particular strongly depresses the L* value. A decrease of even 2 units in L* is perceptible to the eye as a darkening. The polycondensation and total times are not affected much compared with Comparative Example 1. Thus the standard additives for improving the appearance of antimony-based PET are able to achieve a satisfactory colour compensation of the yellow but it is at the expense of darkening the polymer further.

Comparative Example 3

Now, an antimony-zinc catalyst composition for making PET is considered. Firstly, it is shown in Comparative Example 3, a zinc-antimony catalyst composition that is within the scope of U.S. Pat. No. 5,008,230 and 5,166,311. PET was made with the recipe of Example 1 with 200 ppm antimony and 64 ppm zinc (from zinc acetate) added to the reaction mixture. The reaction time is greatly reduced (from 306 minutes, to 220 minutes, Table 1, Comparative Example 3 versus Comparative Example 1). The polycondensation time was reduced from 133 minutes to 71 minutes (Table 1, Comparative Example 3 versus Comparative Example 1). The amorphous, transparent chips made with the composite catalyst in Comparative Example 3 had an extremely high L* value of 71.7. This can be contrasted with the base polymer with 200 ppm antimony alone (Comparative Example 1, Table 1), for which the L* value was 64.7. The b* value in Comparative Example 3 was 5.81 (yellow tint) which is still in a range that can be easily corrected by blue toners. b* values >10 are difficult to compensate because so much blue toner has to be added that the L* value gets depressed.

Example 4

Examples 4-9 of Table 1 show the results of the composite catalyst composition of this invention. In Example 4, PET was made with 140 ppm Sb+128 ppm zinc and without the two colour correction ingredients (cobalt acetate and blue toner). This should be compared with Comparative Example 1. The polycondensation time was reduced from 133 minutes to 60 minutes, and the total reaction time was greatly reduced from 313 minutes to 220 minutes (Comparative Example 1 versus Example 4). The chips had a sparkling appearance compared with Comparative Example 1. The L* values confirm this. L* is 71.9 and b* is 5.63 in Example 4, versus L* of 64.7 and b* of 3.13 in Comparative Example 1. The I.V. in Example 4 is 0.632 dL/g, which is acceptable. The sample of Example 4 should also be compared with Comparative Example 3 (200 ppm Sb+64 ppm Zn), the polymer made with a zinc-antimony catalyst composition that is within the scope of U.S. Pat. No. 5,008,230 and 5,166,311. For the polycondensation time, comparing Example 4 and Comparative Example 3, the former gives a polycondensation time of 60 minutes, compared with 71 minutes for the latter, but the total reaction time is 220 minutes in both. The I.V. for Example 4 is 0.632 versus 0.640 dL/g in Comparative Example 3. In Example 4, L* is 71.9 and b* is 5.63 which compares with L* of 71.7 and b* and 5.81 in Comparative Example 3.Thus, comparable results as with U.S. Pat. Nos. 5,008,230 and 5,166,311 are achieved but with a cheaper catalyst composition (140 ppm Sb+128 ppm zinc).

Example 5

Example 5 of Table 1 shows a PET made with a catalyst composition of the invention consisting of 140 ppm Sb+107 ppm of zinc metal. This should be compared with Comparative Example 1. The polycondensation time is greatly reduced from 133 minutes to 68 minutes and the total reaction time is reduced from 313 minutes to 233 minutes (Example 5 versus Comparative Example 1). The chips had a sparkling appearance compared with Comparative Example 1. For the polymer of Example 5, L* is 71.5 and b* is 4.06, versus L* of 64.7 and b* of 3.13 in Comparative Example 1. A satisfactory I.V. of 0.643 dL/g was achieved in Example 5. This sample should also be compared with Comparative Example 3 (200 ppm Sb+64 ppm Zn), the polymer made with a zinc-antimony catalyst composition that is within the scope of U.S. Pat. No. 5,008,230 and 5,166,311. It can be seen that Example 5 is comparable to Comparative Example 3 in terms of the reduction of polycondensation and total reaction times, and the colour and I.V. of the polymer are also similar. This is achieved in Example 5 with a more economical, lower antimony composition.

Example 6

Example 6 of Table 1 shows another PET made with a catalyst composition according to this invention, namely 140 ppm Sb and 80 ppm of zinc metal, and without colour compensation. This composition is active enough to reach the torque of 13.5 Nm in a favourable time. Example 6 should be compared with the polymer of Comparative Example 1. With this catalyst composition, the polycondensation time is reduced from 133 minutes to 75 minutes and the total reaction time to reach a torque of 13.5 Nm is reduced from 313 minutes to 235 minutes. An I.V. of 0.634 dL/g was reached in Example 6, which is acceptable. The chips had a sparkling appearance compared with Comparative Example 1. The L* values confirm this. For this polymer, L* is 71.9 and b* is 4.67, versus L * of 64.7 and b* of 3.13 in Comparative Example 1. This sample should be compared also with Comparative Example 3 (200 ppm Sb+64 ppm Zn), a composition within the scope of U.S. Pat. Nos. 5,008,230 and 5,166,311. It can be seen that the combination 140 ppm Sb+80 ppm Zn of this Example gives similar results as the system with 200 ppm Sb+64 ppm Zn, but at a reduced catalyst cost.

Example 7

Example 7 was an attempt to make a PET with 140 ppm Sb+40 ppm zinc, and without the two colour correction ingredients (cobalt acetate and blue toner). This should be compared with Comparative Example 1. This composition was found to be not active enough catalytically, and even after a total time of 275 minutes, the torque had only reached 9.95 Nm; the reaction had to be stopped because it was clear that a torque of 13.5 Nm was not going to be attained. With 140 ppm Sb, at least 60 ppm of Zn is necessary for the torque to reach 13.5 Nm, corresponding to an I.V. of ~0.64 dL/g.

Example 8

Example 8 of Table 1 shows that it is possible to work with still lower levels of Sb. The antimony was lowered from 140 to 100 ppm. A PET was made with 100 ppm Sb+128 ppm zinc, and without the two colour correction ingredients (cobalt acetate and blue toner). This should be compared with Comparative Example 1. The polycondensation time was reduced from 133 minutes to 63 minutes, and the total reaction time was greatly reduced from 313 minutes to 228 minutes (Comparative Example 1 versus Example 8). The I.V. of the polymer in Example 8 is 0.630 dL/g, and this is acceptable. The chips had a sparkling appearance compared with Comparative Example 1. The L* values confirm this. L* is 71.5 and b* is 5.37 in Example 10, versus L* of 64.7 and b* of 3.13 in Example 1. Example 8 should also be compared with Comparative Example 3 (200 ppm Sb+64 ppm Zn), the composition within the scope of U.S. Pat. Nos. 5,008,230 and 5,166,311. The catalyst composition of Example 8 (100 ppm Sb+128 ppm Zn) is more economical than the composition of Comparative Example 3 (200 ppm Sb+64 ppm Zn), but it can be seen that it gives similar results in terms of reduction in times, I.V. and colour.

Example 9

It is important for the PET obtained that not only the L* values should be high, but the b* values should not exceed +10, and preferably should be below +5. The b* values indicate yellowness, and values>+10 are difficult to colour compensate by bluing agents without a simultaneous large reduction in the L* value. Example 9 shows a composition of this invention with 100 ppm Sb+128 ppm zinc where colour compensation was carried out to check the appearance properties. The two colour correction ingredients (cobalt acetate and blue toner) were added. The polymer of Example 9 should be compared first with Comparative Example 2. The polycondensation time was reduced from 128 minutes to 63 minutes, and the total reaction time was greatly reduced from 306 minutes to 218 minutes (Comparative Example 2 versus Example 9). The chips of Example 9 had a sparkling appearance compared with Comparative Example 2. L* is 64.7 and b* is −7.9 in Example 9. The polymer is slightly overcompensated as it has a strong blue tint (b*=−7.9 compared with b*=+5.37 for the uncompensated equivalent in Example 8). The L* is reduced from 71.5 in the uncompensated polymer (Example 8) to 64.7 in the compensated equivalent in Example 9, due to the cobalt. However, this is still brighter than the compensated 'standard' antimony polymer of Comparative Example 2 where the L* drops to 57.2.

Comparative Example 10

Comparative Example 10 of Table 1 shows that if one is using only antimony to reduce the polycondensation time to a level of ~65 minutes and the total reaction time to a level of ~220 minutes as in the Examples 4-9, this is possible by using 2.8995 g of antimony triacetate (449 ppm of Sb). The polycondensation time was 66 minutes and the total reaction time was 226 minutes. The total reaction time in Comparative Example 10 is now comparable to the catalyst examples such as 100 ppm antimony+128 ppm zinc (see Table 1, Examples 8-9) or 140 ppm antimony+80-128 ppm zinc (see Table 1, Examples 4-6). However, increasing antimony above 300 ppm as a method of increasing the productivity is not recommended for two reasons. Firstly, antimony is the more expensive component, and 449 ppm will exceed the cost of the composite catalyst combinations of Examples 4-6 and 8-9 in Table 1. Secondly, at this level of addition of antimony, the L* value decreases from 64.7 to 63.7 although the b* value is not changed much (compare Comparative Example 10 with Comparative Example 1 in Table 1); the shorter reaction time reduces yellowing but the higher concentration of antimony invariably causes further darkening. When the polymer with 449 ppm of Sb is corrected for yellow with blue toner and cobalt acetate, it is found that the L* value drops drastically to 54—this is unacceptably dark; in contrast, from Example 9, we see even after colour compensation, the PET made with the inventive catalyst composition can give L* of 64.7. Thus increasing the antimony level above 250-300 ppm is not practically useful as a means to reduce reaction times as it inevitably leads to increased levels of metallic antimony in the polymer, and hence darkened colour, and colour compensation for yellow has a further darkening effect. However, the combination of antimony and zinc in the concentrations shown here gives simultaneously an economical catalyst that increases productivity hugely and gives a brighter appearance to the polymer due to the low antimony content.

For the PET bottle grade resin, polymers with I.V.s of 0.75-0.85 dL/g, with low residual acetaldehyde are required. As mentioned, this is done through a split process—melt polycondensation followed by solid-state polycondensation (SSP). It was important that the SSP rate with the composite catalyst is at least comparable to PET made with 200-300 ppm antimony. To test this, selected intermediate, amorphous polymers of Table 1 were used for SSP (6 hours at 210° C.). The SSP I.V. lift depends on catalyst, SSP time and temperature. The results after SSP (I.V and colour values) are shown in Table 2. The metal concentrations are given in ppm with respect to polymer and also moles/moles (PTA+IPA). The examples and comparative examples use the numbers of Table 1.

In Comparative Example 1 of Table 2, the base polymer with 200 ppm antimony was subjected to SSP. The final I.V. was 0.808 dL/g. The L* value was 87 and the b* value was 2.59. Note that the L* value increases after SSP compared with the amorphous polymer due to spherulitic crystallisation. The amorphous polymer is transparent, but the polymer after SSP is crystalline and white (opaque).

In Comparative Example 2 of Table 2, the standard polymer with 200 ppm of antimony and colour compensation additives was subjected to SSP. The final I.V. was 0.771 dL/g. After colour compensation, the brightness is greatly reduced (L* is 81.9), compared with the base polymer of Comparative Example 1 but the polymer has a blue tint (b*=−3.2). It was found that the compositions with cobalt give lower I.V. after equivalent SSP times (0.771 versus 0.808 dL/g, Comparative Example 2 versus Comparative Example 1).

In Table 2, Examples 4-6, and 8-9, PETs made with the catalyst compositions of this invention are considered after SSP. Example 4 is a PET made with 140 ppm of antimony metal and 128 ppm of zinc metal, without colour compensation additives. The final I.V. after SSP was 0.813 dL/g. This should be compared with Comparative Example 1, Table 2 (0.808 dL/g). The final I.V. is similar to that in Comparative Example 1, even though the starting I.V. was lower (0.632 versus 0.666 dL/g). Thus, this catalyst composition with low antimony disclosed here performs as satisfactorily as 200 ppm antimony in solid-state polycondensation (Comparative Example 1). It can be seen that after SSP in Example 4 of Table 2, the L* value is 90.2 (the polymer is brighter) compared with 87 for the base polymer (Comparative Example 1, Table 2). At the same time the b* value while higher than the antimony-only base polymer (Comparative Example 1) is still below 10. This is correctable with blue toners.

In Table 2, Example 5, a PET with 140 ppm of antimony metal and 107 ppm of zinc metal, without colour compensation is considered. The final I.V. after SSP was 0.815 dL/g. This should be compared with Comparative Example 1, Table 2 (0.808 dL/g). Thus, the inventive catalyst composition lifts the I.V. to a little higher level than the standard 200 ppm antimony in Comparative Example 1. It can be seen that after SSP, the L* value is 90.3 (the polymer is bright) compared with 87 for the base polymer (Comparative Example 1). At the same time the b* value while higher than the antimony-only base polymer (the polymer is yellower, Comparative Example 1), is still below 10.

In Table 2, Example 6, a PET with 140 ppm of antimony metal and 80 ppm of zinc metal, without colour compensation is considered. The final I.V. after SSP was 0.804 dL/g. This should be compared with Comparative Example 1, Table 2 (0.808 dL/g). The inventive catalyst composition lifts the I.V. at least to a similar level as the standard 200 ppm antimony in Comparative Example 1. Again after SSP, the L* value is 90.6 (the polymer is bright) compared with 87 for the base polymer (Comparative Example 1). At the same time the b* value while higher than the antimony only base polymer (the polymer is yellower, Comparative Example 1) is still below 10 and so can be compensated.

In Table 2, Examples 8 and 9, PETs with even lower levels of antimony in the composite catalyst are considered. In Example 8, we have 100 ppm of antimony metal+128 ppm of zinc metal, without colour compensation. The final I.V. after SSP was 0.801 dL/g. This should be compared with Comparative Example 1, Table 2 (0.808 dL/g). Although the starting I.V. was lower (0.630 versus 0.666 dL/g), after SSP, the gap relative to the base polymer is closed. The catalyst composition of Example 8 lifts the I.V. to a similar level as the standard 200 ppm antimony in Comparative Example 1. After SSP, the L* value is 89.9 (the polymer is bright) compared with 87 for the base polymer (Comparative Example 1). At the same time the b* value while higher than the antimony-only base polymer (the polymer is yellower, Comparative Example 1), is below+10.

In Example 9, Table 2, 100 ppm of antimony metal+128 ppm of zinc metal are used, but with blue toner and cobalt acetate for yellow colour compensation. The final I.V. after SSP was 0.787 dL/g. This should be compared with the standard, colour-corrected polymer of Comparative Example 2, Table 2 (I.V.=0.771 dL/g). The presence of cobalt reduces the final I.V. in both cases. Although the starting I.V. was lower in Example 9 compared with Comparative Example 2 (0.626 versus 0.644 dL/g), during SSP, the gap relative to the standard polymer is closed. The catalyst composition of Example 9 lifts the I.V. to a slightly higher level than the standard 200 ppm antimony in Comparative Example 2 (0.787 versus 0.771 dL/g). After colour compensation, the L* value decreases to 84.2 compared with the 89.9 in the uncorrected equivalent (Example 8), but the yellow colour is removed (b* value −3.12 versus +9.17, compare Example 9 versus Example 8, Table 2). Also, compared with the colour-compensated, standard polymer (Table 2, Comparative Example 2, 200 ppm antimony only), the L* value in Example 9 is higher.

The features disclosed in the foregoing description and in the claims may, both separately and in any combination thereof, be material for realising the invention in diverse forms thereof.

TABLE 1

'Total Time' is the total reaction time (reactor heat-up + esterification + polycondensation) to reach a fixed agitator torque of 13.5 Nm (corresponding to I.V. of ~0.64 dL/g).

| Ex. | Sb (ppm) | Zn (ppm) | Co (ppm) | Blue toner (g) | I.V. (dL/g) | L* | a* | b* | Vacuum (mbar) | Polycondensation time (mins). | Total Time (mins) | Comments |
|---|---|---|---|---|---|---|---|---|---|---|---|---|
| 1 | 200 | 0 | 0 | 0 | 0.666 | 64.7 | −1.3 | 3.13 | 0.57 | 133 | 313 | 'Base polymer' |
| 2 | 200 | 0 | 15.7 | 0.0053 | 0.644 | 57.2 | −3.5 | −5.1 | 1.14 | 128 | 306 | 'colour corrected standard' |
| 3 | 0 | 217 | 0 | 0 | 0.633 | 71.9 | −1.67 | 5.04 | 1.39 | 70 | 215 | No gray |
| 4 | 200 | 64 | 0 | 0 | 0.640 | 71.7 | −1.99 | 5.81 | 2.21 | 71 | 220 | Reduced gray |
| 5 | 140 | 128 | 0 | 0 | 0.632 | 71.9 | −1.41 | 5.63 | 1.24 | 60 | 220 | |
| 6 | 140 | 107.4 | 0 | 0 | 0.643 | 71.5 | −1.16 | 4.06 | 1.21 | 68 | 233 | |
| 7 | 140 | 80 | 0 | 0 | 0.634 | 71.9 | −1.32 | 4.67 | 1.13 | 75 | 235 | |
| 8 | 140 | 40 | 0 | 0 | | | | | | | | Torque 13.5 Nm not reached |
| 9 | 100 | 128 | 0 | 0 | 0.630 | 71.5 | −1.32 | 5.37 | 1.35 | 63 | 228 | |
| 10 | 100 | 128 | 15.7 | 0.0053 | 0.626 | 64.7 | −4.7 | −7.9 | 1.09 | 63 | 218 | |
| 11 | 449 | 0 | 0 | 0 | 0.645 | 63.7 | −1.67 | 3.05 | 1.07 | 66 | 226 | Dark gray |

TABLE 2

Properties after SSP, 6 h, 210° C. Example numbers are the same as in Table 1. Colour compensation means addition of cobalt and blue toner (see Table 1)

| Example | Zn (ppm) | Zn mol/mol PTA (×10⁴) | Sb (ppm) | Sb mol/mol PTA (×10⁴) | Starting I.V. (dL/g) | SSP I.V. (dL/g) | L* | a* | b* | Comments |
|---|---|---|---|---|---|---|---|---|---|---|
| 1 | 0 | 0 | 200 | 3.18924 | 0.666 | 0.808 | 87 | −1.24 | 2.59 | |
| 2 | 0 | 0 | 200 | 3.18924 | 0.644 | 0.771 | 81.9 | −2.92 | −3.2 | With colour compensation |
| 3 | 217 | 6.3724 | 0 | 0 | 0.633 | 0.732 | 89.7 | −0.62 | 8.68 | |
| 5 | 128 | 3.76243 | 140 | 2.23247 | 0.632 | 0.813 | 90.2 | −0.99 | 8.3 | |
| 6 | 107.4 | 3.15435 | 140 | 2.23247 | 0.643 | 0.815 | 90.3 | −1.07 | 6.89 | |
| 7 | 80 | 2.34963 | 140 | 2.23247 | 0.634 | 0.804 | 90.6 | −1.05 | 7.56 | |
| 9 | 128 | 3.76243 | 100 | 1.59462 | 0.630 | 0.801 | 89.9 | −0.89 | 9.17 | |
| 10 | 128 | 3.76243 | 100 | 1.59462 | 0.626 | 0.787 | 84.2 | −4.3 | −3.2 | With colour compensation |

The invention claimed is:

1. Process for the production of polyethylene terephthalate from terephthalic acid and ethylene glycol, comprising the steps of:
   (a) preparing a catalyst composition consisting of an antimony compound, being present such that the elemental antimony content is in a range of about 100 to about 140 ppm, and a zinc compound, being present such that the elemental zinc content is in a range of about 80 to about 140 ppm, wherein the ppm amounts by weight are based on the theoretical yield of polyethylene terephthalate;
   (b) placing the catalyst composition, the terephthalic acid and the ethylene glycol in a vessel; and
   (c) reacting the terephthalic acid and the ethylene glycol in an esterification step and a polycondensation step to obtain polyethylene terephthalate.

2. Process according to claim 1 wherein the antimony compound is selected from the group consisting of antimony triacetate, antimony trioxide, antimony tricarbonate, antimony glycolate or mixtures thereof.

3. Process according to claim 1 wherein the zinc compound is selected from the group consisting of zinc acetate, zinc oxide, zinc peroxide, zinc suiphide, zinc carbonate, zinc hydroxide, zinc halide, zinc metal or mixtures thereof.

4. Process according to claim 1 wherein the esterification step is conducted at a temperature of about 230 to about 260° C. and wherein the polycondensation step is conducted at a temperature of about 270 to about 290° C.

5. Process according to claim 1 wherein the polycondensation step is conducted in the melt phase under high vacuum in a batch process.

6. Process according to claim 1 wherein the polycondensation step is conducted in the melt phase in a continuous process using a train of reactors in series for esterification and polycondensation.

7. Process according to claim 1 wherein the polycondensation step is conducted in a split operation using first a melt phase polycondensation step under high vacuum and subsequently a solid state polycondensation step, under vacuum or nitrogen flow.

8. Process according to claim 7 where the solid state polycondensation step is conducted in a batch or continuous operation.

9. Process according to claim 1 wherein a comonomer is additionally placed in the vessel before the start of the polycondensation step.

10. Process according to claim 9, wherein the comonomer is isophthalic acid, cyclohexane dimethanol or mixtures thereof.

11. Process according to claim 1 wherein phosphoric acid in an amount of about 10 to about 30 ppm is added to the vessel.

12. Process according to claim 1 wherein at least one color correction is added to the vessel.

13. Process according to claim 12 wherein the color correction is cobalt acetate and/or blue toner.

14. Process according to claim 1 wherein the catalyst components are placed in the vessel together before, during or after the esterification step.

15. Process according to claim 1 wherein the catalyst components are placed in the vessel separately and at different times before, during or after the esterification step.

* * * * *